United States Patent
Chan et al.

(10) Patent No.: US 12,399,887 B1
(45) Date of Patent: Aug. 26, 2025

(54) MERGING OF DISSIMILAR DATA STRUCTURES HAVING DISSIMILAR DATA FOR GENERATION OF MACHINE LEARNING INPUT

(71) Applicant: Intuit Inc., Mountain View, CA (US)

(72) Inventors: Raymond Chan, San Diego, CA (US); Anuj Kumar, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/651,673

(22) Filed: Apr. 30, 2024

(51) Int. Cl.
*G06F 7/00* (2006.01)
*G06F 16/23* (2019.01)
*G06N 20/00* (2019.01)

(52) U.S. Cl.
CPC .......... *G06F 16/2365* (2019.01); *G06N 20/00* (2019.01)

(58) Field of Classification Search
CPC ............................ G06F 16/2365; G06N 20/00
USPC ......................................................... 707/756
See application file for complete search history.

(56) References Cited

U.S. PATENT DOCUMENTS

2019/0102681 A1* 4/2019 Roberts .................. G06N 20/00

* cited by examiner

*Primary Examiner* — Isaac M Woo
(74) *Attorney, Agent, or Firm* — Lathrop GPM LLP

(57) ABSTRACT

A method including receiving a first and second data structures storing first and second data stored a first format and a second format. The first and second data are associated with a key. The first and second data and formats are dissimilar, but are related according to the key. A data conversion controller is applied to the first and second data structures to generate a third data structure that stores, in a third data format and associated with the key, both the first data and second data. A vector generation controller is applied to the third data structure to generate a vector including features representing the first and second data. A subset of features is determined from the features according to a type of the subject. A trained supervised machine learning model with the subset of features is applied to the vector to generate a prediction, which is presented.

20 Claims, 6 Drawing Sheets

MERGING OF DISSIMILAR DATA STRUCTURES HAVING DISSIMILAR DATA FOR GENERATION OF MACHINE LEARNING INPUT

BACKGROUND

The accuracy of a machine learning model may depend on the amount of available input data to the machine learning model. In some cases, the amount of available input data is insufficient for the machine learning model to output a prediction that is above a desired measurable accuracy of the machine learning model. In such cases, finding additional data to supplement the currently available data may be desirable.

However, the supplemental data may be in a different format than the available input data. Furthermore, the supplemental data may be stored in a data structure that is different than the data structure in which the available input data is stored. The differently structured and formatted data sets, if input directly to the machine learning model, may result in an incorrect prediction by the machine learning model.

Further complicating the difficulty of using differently formatted and structured data in machine learning, some machine learning models may be more accurate when executed using a narrow range of the number of features considered by the machine learning model. A feature is a topic of data (e.g., a color of an object, the presence of a word or alphanumeric text, a physical measurement type, etc.) used by a machine learning model to generate a prediction. However, it may not be known in advance which subset of features, among a larger set of features that exceeds the narrow range, should be used to maximize the accuracy of the machine learning model when called to output the prediction.

In some cases, both issues may be a consideration. In other words, it may be desirable to combine different data in different formats and structures, and also desirable to determine which features to use when applying the machine learning model to the combined data.

SUMMARY

One or more embodiments provide for a method. The method includes receiving, at a processor, a first data structure storing first data, in a first format, regarding a subject associated with a key stored in the first data structure. The method also includes receiving, at the processor, a second data structure storing second data, in a second format, regarding the subject associated with the key that is also stored in the second data structure. The second data is dissimilar to the first data and the first format is dissimilar to the second format. The method also includes relating the first data to the second data according to the key. The method also includes applying a data conversion controller to the first data structure and the second data structure to generate a third data structure. The third data structure stores, in a third data format and associated with the key, both the first data and the second data for the subject. The method also includes applying a vector generation controller to the third data structure to generate a vector including features representing the first data and the second data. The method also includes determining, from the features and according to a type of the subject, a subset of features including fewer features than the features. The method also includes applying a trained supervised machine learning model with the subset of features to the vector to generate a prediction. The method also includes presenting the prediction.

One or more embodiments provide for a system. The system includes a computer processor and a data repository in communication with the computer processor. The data repository stores a first data structure storing first data, in a first format, regarding a subject associated with a key stored in the first data structure. The data repository also stores a second data structure storing second data, in a second format, regarding the subject associated with the key that is also stored in the second data structure. The second data is dissimilar to the first data and the first format is dissimilar to the second format. The data repository also stores a third data structure. The third data structure stores, in a third data format and associated with the key, both the first data and the second data for the subject. The data repository also stores a type of the subject. The data repository also stores a vector including features representing the first data and the second data. The data repository also stores a subset of features including fewer features than the features. The data repository also stores a prediction. The system also includes a data conversion controller which, when executed by the computer processor and applied to the first data structure and the second data structure, generates the third data structure. The system also includes a vector generation controller which, when executed by the computer processor and applied to the third data structure, generates the vector. The system also includes a trained supervised machine learning model which, when executed by the computer processor and applied with the subset of features to the vector, generates the prediction. The system also includes a server controller which, when executed by the computer processor, is configured to relate the first data to the second data according to the key. The server controller is also configured to determine, from the features and according to the type of the subject, the subset of features. The server controller is also configured to present the prediction.

One or more embodiments provide for another method. The method includes receiving, at a computer processor, a first data structure storing first data, in a first format, regarding a subject associated with a key stored in the first data structure. The method also includes receiving, at the computer processor, a second data structure storing second data, in a second format, regarding the subject associated with the key that is also stored in the second data structure. The second data is dissimilar to the first data and the first format is dissimilar to the second format. The method also includes relating the first data to the second data according to the key. The method also includes applying a data conversion controller to the first data structure and the second data structure to generate a third data structure. The third data structure stores, in a third data format and associated with the key, both the first data and the second data for the subject. The method also includes cleansing the third data structure to generate a cleansed data structure. The method also includes applying a vector generation controller to the cleansed data structure to generate a vector including features representing the first data and the second data. The method also includes determining, from the features and according to a type of the subject, a subset of features including fewer features than the features. Determining the subset of features further includes determining a first feature related to a complexity of the subject. Determining the subset of features further includes determining a second feature related to a procedure unrelated to the subject. The subset of features include at least the first feature and the second feature. The method also includes applying a trained supervised machine learning model with the subset of features to the vector to generate a prediction including a probability that the subject benefits from the procedure. The method also includes identifying, responsive to the probability satisfying a threshold, a software application for providing the procedure. The method also includes providing the procedure via the software application.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

Figure 1A:
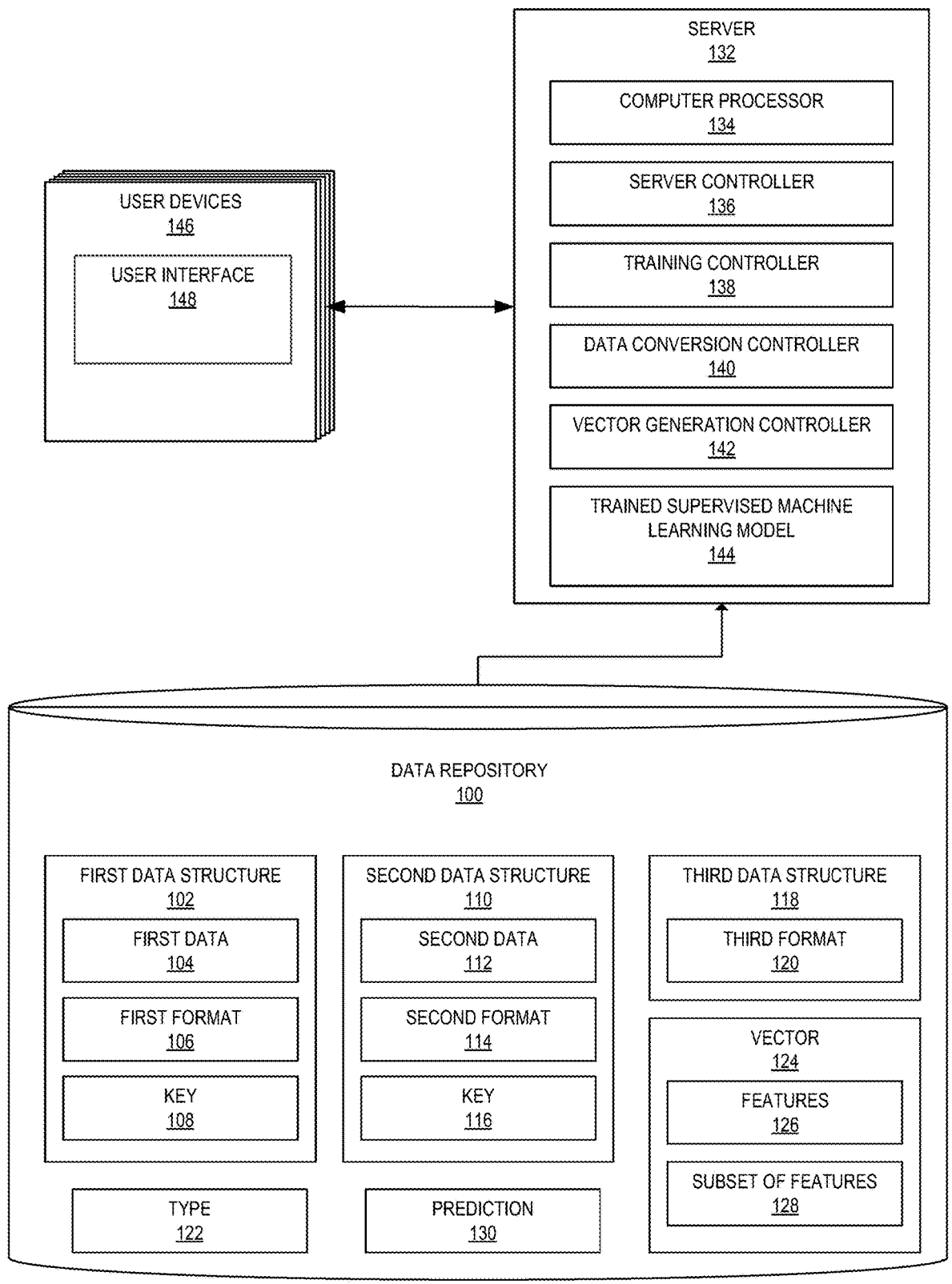
FIG. 1A and FIG. 1B show a computing system, in accordance with one or more embodiments.

One or more embodiments are directed to methods and systems for merging of dissimilar data structures having dissimilar data for generation of machine learning input. In other words, one or more embodiments relate to systems and methods for gathering an increased amount of data for machine learning input (by accessing one or more dissimilar data sources), while concurrently adjusting the number of features used by the machine learning model to generate the desired prediction. The result is an improvement to overall accuracy of the machine learning model.

In one or more embodiments, data from multiple dissimilar data sources is acquired. A key is present in both sources of data. The key is a type of data that is common to both sets of data. For example, if the data relates to businesses, then the key may be a United States Federal Tax Identification number, a data universal numbering system (DUNS) identification number, etc. Thus, each subject in the data (e.g., each business) has a key that uniquely identifies that subject in each of the dissimilar data sets.

The data in each of the dissimilar data sets is gathered into a new data structure that contains information from each of the dissimilar data sets. Because each of the dissimilar data sets include the same keys, any information (regardless of data source) relating to a given subject may be associated with that given subject in the new data structure. The new data structure is then cleansed (duplicate or similar data may be removed, data may be stored in a standardized format, incomplete data may be removed, etc.). Additionally, the data contained in the data structure thereafter may be organized by feature, and converted into a vector format. A vector is a data structure which is suitable for input to a machine learning model when the machine learning model is executed by a computer processor.

Because the identities of features to be used at prediction time may vary, many features may be stored in the vector even though most of the features may not be used during any given prediction. For example, one hundred features may be tracked, even though only ten features may be selected from the one hundred features at machine learning inference time. The one hundred features may be arranged in rows of a table data structure. The columns of the table data structure may be the keys (e.g. DUNS number) associated with each subject being considered. Thus, a cell of the table reflects the value of a feature for a given subject.

When a prediction is to be generated, first a subset of the features is selected from among the available features. The selection of the subset of features may be based on a number of factors. In an embodiment the selection of the subset of features is based on a type of the subject. For example, if the subject is business having a certain industry type, then a pre-determined selection of features is selected for the subject according to that subject's industry type. However, selection of the subset of features also may be based on other factors, such as a type of the prediction, the type of the machine learning model being used, combinations thereof, etc.

Additionally, the number of features selected for use may be limited based on the type of machine learning model being used. For example, one type of machine learning model may be limited to ten features, but another type of machine learning model may be limited to fifteen features. The number of features made available to the machine learning model may be selected based on a known peak accuracy of the machine learning model when a pre-determined number of features are used by the selected machine learning model.

Finally, the machine learning model is applied to the subset of features (e.g., executed by a computer processor, taking the subset of features as input). The output of the machine learning model is the prediction of interest.

Attention is now turned to the figures. FIG. 1A shows a computing system, in accordance with one or more embodiments. The system shown in FIG. 1A includes a data repository (100). The data repository (100) is a type of storage unit or device (e.g., a file system, database, data structure, or any other storage mechanism) for storing data. The data repository (100) may include multiple different, potentially heterogeneous, storage units, and/or devices.

The data repository (100) stores a first data structure (102). In general, a data structure is a format for organizing, processing, retrieving, and storing data. There are several basic and advanced types of data structures, all designed to arrange data to suit a particular purpose. A data structure may be selected or designed to store data for a pre-determined algorithm. In some cases, the algorithm's basic operations may be coupled to the data structure's design. For instance, in an object-oriented programming language, the data structure and the associated methods of the language may be bound together as part of a class definition. Examples of data structures include linear data structures (e.g., arrays, queues, stacks, linked lists), non-linear data structures (e.g., trees or graphs), and others.

As used herein, the first data structure (102) is referred-to as a "first" data structure to distinguish the first data structure (102) from other data structures. For example, the first data structure (102) is different than the second data structure (110) (defined below) and is different than the third data structure (118) (defined below). Otherwise, the terms "first," "second," "third," etc., when used with respect to "data structures," do not limit the associated data structure.

The first data structure (102) includes first data (104). The first data (104) is information (i.e., data) stored in the first data structure (102). Again, as used herein, the use of ordinal terms (i.e., "first," "second," etc.) with respect to the term "data" distinguishes different data sets, and the ordinal terms themselves do not limit the nature of the data.

The first data (104) may be stored according to a first format (106). The first format (106) is the data format in which the first data (104) is stored in the first data structure (102). For example, the first format (106) may be a numerical format, a binary format, an alphanumerical format, a model-specific format, a software language-specific format, or many other types of data formats. Again, as used herein, the use of ordinal terms (i.e., "first," "second," etc.) with respect to the term "format" distinguishes different formats, and the ordinal terms themselves do not limit the nature of the formats.

The first data structure (102) includes, as at least one data item in the first data (104), a key (108). The key (108) is a data item that is common to other data structures accessed when performing the method of FIG. 2. Additionally, the key (108) also uniquely identifies a subject. The subject is an entity of interest, uniquely identified by the key (108). For example, the subject may be a specific business.

Figure 2:
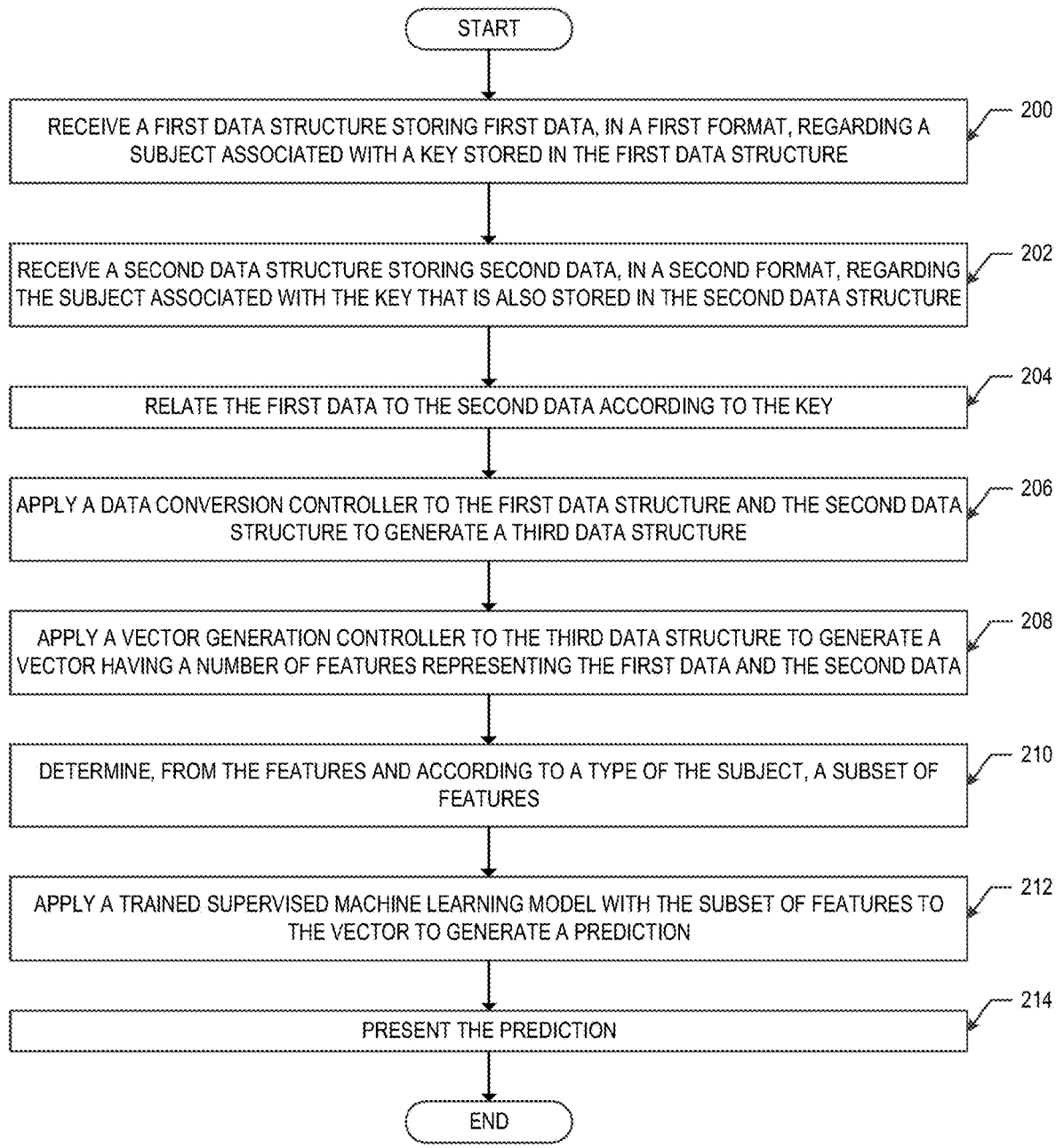
FIG. 2 shows a flowchart of a method for merging of dissimilar data structures having dissimilar data for generation of machine learning input, in accordance with one or more embodiments.

Thus, among the data structures accessed during the method of FIG. 2, the key (108) is common to the data structures and uniquely identifies a common subject. In an example, the key (108) may be a DUNS or tax identification number that is present, for each subject, in each of the data structures.

The data repository (100) also stores a second data structure (110). The second data structure (110) has a definition similar to the first data structure (102), except that the second data structure (110) is dissimilar to the first data structure (102) and except that the first data structure (102) may store different information than the second data structure (110). The term "dissimilar data structures" means that the data structures in question are dissimilar in at least one data structure type or data format type. For example, the first data structure (102) is dissimilar to the second data structure (110) when the first data structure (102) has a different kind of data structure than the second data structure (110). In a more specific example, an array data structure is similar to a tree data structure. In a different example, the first data structure (102) is dissimilar to the second data structure (110) when the first format (106) is dissimilar to the second format (114), even if both the second data structure (110) and the first data structure (102) share a common type of data structure.

Similarly, the second data (112) has a definition similar to the first data (104), except that the second data (112) may be different than the first data (104). Data sets are "dissimilar" when at least some of the information in one of the data sets is not found in the other data set. For example, the first data (104) is dissimilar to the second data (112) when the first data (104) stores income information for a business and the second data (112) does not store income information for the business.

Similarly, the second format (114) has a definition similar to the first format (106), except that the second format (114) may be different than the first format (106). Data formats are "dissimilar" when the format of the two data sets do not match exactly. For example, if the first format (106) is alphanumeric text and the second format (114) is information stored in an application-specific file, then the two data formats are dissimilar.

The second data structure (110) also stores a key (116). The key (116) is the same information as the key (108), except that the key (116) may be distinguished from the key (108) in that the two keys may be stored in dissimilar formats. However, even if stored in dissimilar formats, the key (108) and the key (116) refer to the same information that uniquely identifies the same subject in both the first data (104) and the second data (112). For example, if the key (108) is a DUNS number for a unique subject, then the key (116) is also the same DUNS number for that unique subject; however, the key (116) and the key (108) may be stored in different formats.

The first data structure (102) and the second data structure (110) may be from different data sources. For example, the first data structure (102) may be a profile of a user, as stored for use with a specific software application. The profile may store the key (108) that uniquely identifies the user. In this case, the second data structure (110) may be additional information about the user stored in one or more remote data sources. The second data structure (110) contains the key (116) associated with the same user, though the key (116) may be in a different format than the key (108). In use, the second data structure (110) is retrieved from the remote data source using the key (108) and the key (116) (i.e., the common key is identified so that information about the user in the second data structure (110) may be added to the information about the user in the first data structure (102)).

The data repository (100) also stores a third data structure (118). The third data structure (118) has a definition similar to the first data structure (102) and the second data structure (110), except that the third data structure (118) stores at least some of the information from both the first data (104) and the second data (112). The third data structure (118) may be a pre-determined type of data structure. The third data structure (118) may be of a different type of data structure than the first data structure (102), the second data structure (110), or both.

The third format (120) has a definition similar to the first format (106) and the second format (114). However, the third data structure (118) stores at least some of the first data (104) and at least some of the second data (112). The third data structure (118) also stores the key (i.e., the key (108) or the key (116)), though the key may be in a third format (120).

The third format (120) has a definition similar to the first format (106) or the second format (114), except that the third format (120) is associated with the third data structure (118). The third format (120) may be the same format as the first data (104), the same format as the second data (112), or may be a format type that is different than either the first format (106) or the second format (114).

The data repository (100) also stores a type (122). The type (122) is data that defines a type of information about a subject. For example, if the subject is a business, then the type (122) may be a financial complexity of the business, as defined by a quantitative assessment of various information about the business (e.g., number of departments, number of employees, number of locations, etc.). Thus, the type (122) need not be directly stored in the first data (104) or the second data (112), but may be inferred from one or both of the first data (104) and the second data (112). In an embodiment, the type (122) may be stored in the third data structure (118).

The data repository (100) also stores a vector (124). The vector (124) is a type of data structure suitable for input to a machine learning model, such as the trained supervised machine learning model (144) defined below. The vector (124) may be a 1×N array, where each value of the array represents the value of a corresponding feature in the features (126), defined below. However, the vector (124) may be an M×N array, meaning that the array may have multiple columns and rows.

The vector (124) is defined by a number of features (126). The features (126) represent information items describing the subject. For example, the features (126) may include the key (the key (108) or the key (116)), a numerical parameter associated with the subject, etc. In a specific example, the features (126) may include information about a business, such as the year the business started, the type of business, how many locations the business operates, the number of employees of the business, the gross or net income of the business, etc.

The vector (124) may be a subset of features (128). The subset of features (128) is composed of selected ones of the features (126). There are fewer features in the subset of features (128) relative to the features (126). In an embodiment, the subset of features (128) is selected at inference time when generating a prediction, as described with respect to FIG. 2. The features (126), as mentioned above and as described with respect to FIG. 2, may be selected according to a type of the subject or according to some other rule or policy.

The data repository (100) also stores a prediction (130). The prediction (130) is a numerical value or values output by a machine learning model, such as the trained supervised machine learning model (144) defined below. The prediction (130) may be, for example, a probability that the subject benefits from a procedure (e.g. the subject may benefit by referral to a professional). The prediction (130) may be, for example, a probability that the subject satisfies a benchmark (e.g., a creditworthiness score). The nature of the prediction depends on the purpose and programming of the machine learning model.

The system shown in FIG. 1A may include other components. For example, the system shown in FIG. 1A also may include a server (132). The server (132) is one or more computer processors, data repositories, communication devices, and supporting hardware and software. The server (132) may be in a distributed computing environment. The server (132) is configured to execute one or more applications, such as the server controller (136), the training controller (138), the data conversion controller (140), the vector generation controller (142), or the trained supervised machine learning model (144). An example of a computer system and network that may form the server (132) is described with respect to FIG. 5A and FIG. 5B.

The server (132) includes a computer processor (134). The computer processor (134) is one or more hardware or virtual processors which may execute computer readable program code that defines one or more applications, such as the server controller (136), the training controller (138), the data conversion controller (140), the vector generation controller (142), and the trained supervised machine learning model (144). An example of the computer processor (134) is described with respect to the computer processor(s) (502) of FIG. 5A.

The server (132) hosts a server controller (136). The server controller (136) is software or application specific hardware which, when executed by the processor (134), implements certain steps described in FIG. 2 (e.g., the retrieval or receiving of the data structures at steps 200 and 202, relating data to the key at step 204, determining the subset of features at step 210, and presenting the prediction at step 214). The server controller (136) also may coordinate operation of other controllers or software executable by the computer processor (134). For example, the server controller (136) may coordinate execution of the training controller (138), data conversion controller (140), vector generation controller (142), and trained supervised machine learning model (144), defined below. Thus, generally, the server controller (136) is responsible for coordinating or executing the method of FIG. 2.

The server (132) also hosts a training controller (138). The training controller (138) is software or application specific hardware which, when executed by the computer processor (134), trains one or more machine learning models (e.g., the trained supervised machine learning model (144)). The training controller (138) is described in more detail with respect to FIG. 1B.

The server (132) also hosts a data conversion controller (140). The data conversion controller (140) is software or application specific hardware which, when executed by the computer processor (134), converts data from one format or data structure to another format or data structure. Thus, for example, the data conversion controller (140) performs step 206 of FIG. 2 (converting the first data structure (102) and the second data structure (110) to the third data structure (118)). Examples of data conversion controllers include open source software such as CloverDX, Pentaho Kettle, Hevo Data, Scriptella, and others. The data conversion controller (140) also may be proprietary data conversion software.

The server (132) also hosts a vector generation controller (142). The vector generation controller (142) may be an embedding machine learning model that is trained to convert natural language text into a vector data structure composed of features and values. An example of the vector generation controller (142) may be an ADA-002 machine learning model. However, many different embedding models may be used. Use of the vector generation controller (142) is described with respect to FIG. 2.

The server (132) also hosts a trained supervised machine learning model (144). Generally, a machine learning model is software or application specific hardware trained to identify hidden patterns in data. A supervised machine learning model is a type of machine learning model that uses labeled data during training. The nature and training of a supervised machine learning model is described with respect to FIG. 1B. Examples of supervised machine learning models include a K-nearest neighbor classifier, a naïve Bayes classifier, a decision tree classifier, a bootstrap aggregation classifier (i.e., a "bagging" classifier), and others.

Figure 1B:
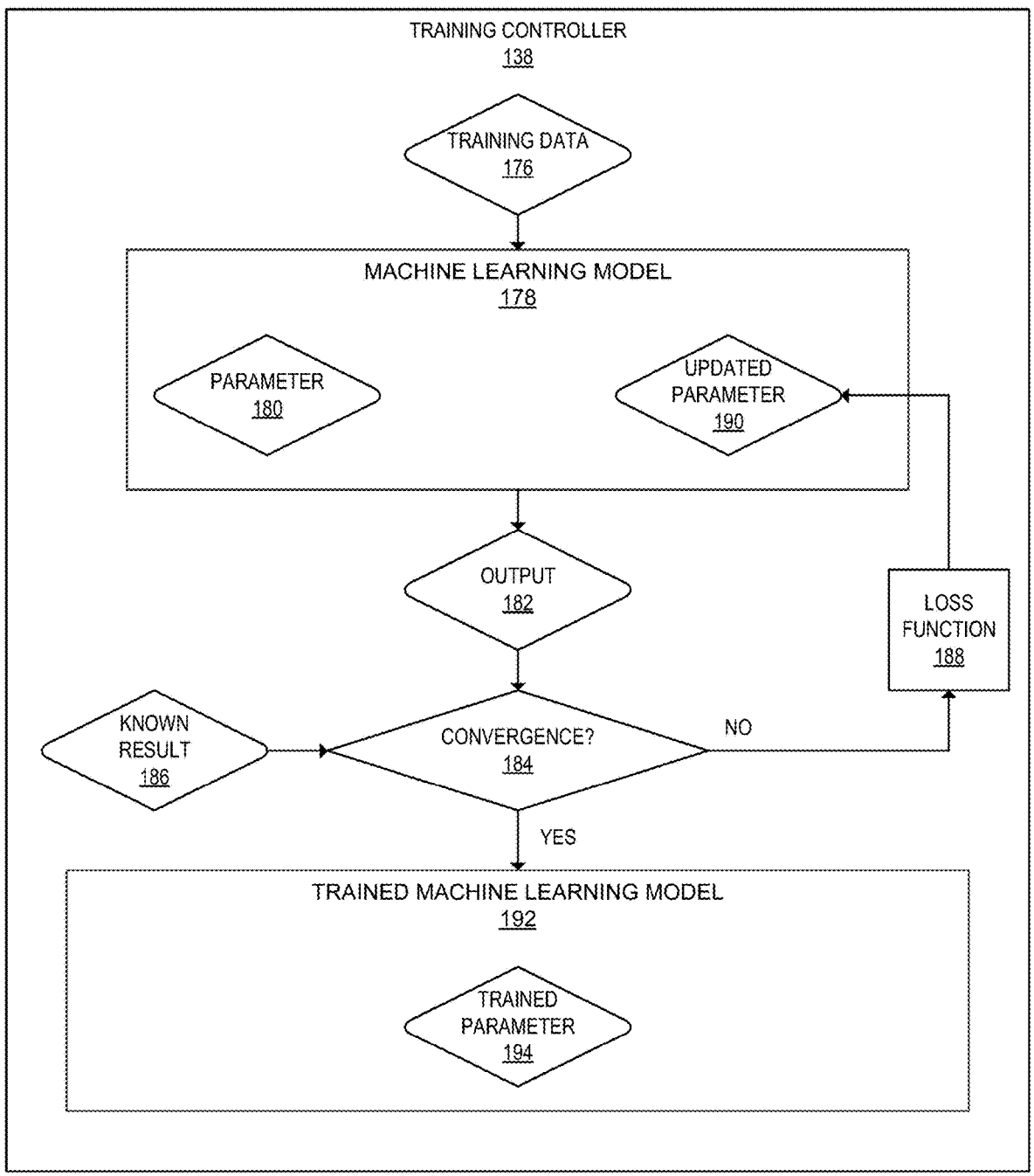

The trained supervised machine learning model (144) is referred to as "trained" after the supervised machine learning model has been trained according to the method described with respect to FIG. 1B. Training the underlying supervised machine learning model transforms the model by transforming the weights that the model applies during execution. Thus, a trained machine learning model (whether supervised or unsupervised) is not the same model as the original model before training.

While one or more embodiments contemplate use of the trained supervised machine learning model (144), in some embodiments an unsupervised machine learning model may be used. Thus, one or more embodiments are not limited to use of a supervised machine learning model.

The system shown in FIG. 1A also may include one or more user devices (146). The user devices (146) are computing systems which one or more users may use to access the server (132). In some cases, the user devices (146) may not be part of the system of FIG. 1A, but rather may be remote devices used by third-party users. For example, the user devices (146) may be operated by end users that receive an output generated as a result of the prediction generated by the trained supervised machine learning model (144). See, for example, FIG. 3 and FIG. 4 for an example of a message generated as a result of the prediction generated by a machine learning model according to one or more embodiments.

The user devices (146) each may include a user interface (148). The user interface (148) is a device which allows a user to view or otherwise apprehend information. For example, the user interface (148) may be a monitor, a touch screen, a television, a speaker, a haptic device, etc.

Attention is turned to FIG. 1B, which shows the details of the training controller (138). The training controller (138) is a training algorithm, implemented as software or application specific hardware, that may be used to train one or more of the machine learning models described with respect to the computing system of FIG. 1A.

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model is applied to unknown data (i.e., data for which the actual result is not known) in order to make predictions.

Some machine learning models may be applied to vector data structures. A vector is a computer-readable data structure. A vector may take the form of a matrix, an array, a graph, or some other data structure. However, a frequently used vector form of is one by N matrix, where each cell of the matrix represents the value for one feature. As described above, a feature is a topic of data (e.g., a color of an object, the presence of a word or alphanumeric text, a physical measurement type, etc.). A value is a numerical or other recorded specification of the feature. For example, if the feature is the word "cat," and the word "cat" is present in a corpus of text, then the value of the feature may be "1" (to indicate a presence of the feature in the corpus of text).

In one or more embodiments, some of the data in the data repository (100) of FIG. 1A may be stored in the form of one or more vectors. For example, the vector (124) is a vector. The first data structure (102), the second data structure (110), or the third data structure (118) may be vectors (as a vector is a type of data structure).

Returning to the operation of the training controller (138), training starts with training data (176), which may be expressed as a training data vector. The training data (176) may be the vector (124) from FIG. 1A, when the vector (124) is composed from training data for which a predicted result is already known (i.e., information in the third data structure (118) is known to correspond to a particular result (e.g., that a given subject is subject to a procedure)). The training data (176) may be data for which the final result is known with certainty. For example, if the machine learning task is to identify whether two names refer to the same entity, then the training data (176) may be name pairs for which it is already known whether any given name pair refers to the same entity.

The training data (176) is provided as input to the machine learning model (178). The machine learning model (178) may be characterized as a program that has adjustable parameters. The program is capable of learning and recognizing patterns to make predictions. The output of the machine learning model (178) may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

One or more initial values are set for the parameter (180). The machine learning model (178) is then executed on the training data (176). The result is an output (182), which is a prediction, a classification, a value, or some other output which the machine learning model (178) has been programmed to output.

The output (182) is provided to a convergence process (184). The convergence process (184) is programmed to achieve convergence during the training process. Convergence is a state of the training process, described below, in which a pre-determined end condition of training has been reached. The pre-determined end condition may vary based on the type of machine learning model (178) being used (supervised versus unsupervised machine learning), or may be pre-determined by a user (e.g., convergence occurs after a set number of training iterations, described below).

In the case of supervised machine learning (e.g., the trained supervised machine learning model (144) of FIG. 1A), the convergence process (184) compares the output (182) to a known result (186). The known result (186) is stored in the form of labels for the training data (176). For example, the known result (186) for a particular entry in an output (182) vector of the machine learning model (178) may be a known value, and that known value is a label that is associated with the training data (176).

Continuing the example of supervised machine learning model training, a determination is made whether the output (182) matches the known result (186) to a pre-determined degree. The pre-determined degree may be an exact match, a match to within a pre-specified percentage, or some other metric for evaluating how closely the output (182) matches the known result (186). Convergence occurs when the known result (186) matches the output (182) to within the pre-determined degree.

In the case of unsupervised machine learning, the convergence process (184) may be compared to the output (182) or to a prior output in order to determine a degree to which the current output changed relative to the immediately prior output or to the original output. Once the degree of changes fails to satisfy a threshold degree of change, then the machine learning model may be considered to have achieved convergence. Alternatively, an unsupervised model may determine pseudo labels to be applied to the training data and then achieve convergence as described above for a supervised machine learning model. Other machine learning training processes exist, but the result of the training process may be convergence.

If convergence has not occurred (a "no" at the convergence process (184)), then a loss function (188) is generated. The loss function (188) is a program which adjusts the parameter (180) (one or more weights, settings, etc.) in order to generate an updated parameter (190). The basis for performing the adjustment is defined by the program that makes up the loss function (188), but may be a scheme which attempts to guess how the parameter (180) may be changed so that the next execution of the machine learning model (178) using the training data (176) with the updated parameter (190) will have an output (182) that is more likely to result in convergence. (E.g., that the next execution of the machine learning model (178) is more likely to match the known result (186) (supervised learning), or which is more likely to result in an output (182) that more closely approximates the prior output (one unsupervised learning technique), or which otherwise is more likely to result in convergence.)

In any case, the loss function (188) is used to specify the updated parameter (190). As indicated, the machine learning model (178) is executed again on the training data (176), this time with the updated parameter (190). The process of execution of the machine learning model (178), execution of the convergence process (184), and the execution of the loss function (188) continues to iterate until convergence.

Upon convergence (a "yes" result at the convergence process (184)), the machine learning model (178) is deemed to be a trained machine learning model (192). The trained machine learning model (192) has a final parameter, represented by the trained parameter (194). Again, the trained parameter (194) shown in FIG. 1B may be multiple parameters, weights, settings, etc.

During deployment, the trained machine learning model (192) with the trained parameter (194) is executed again, but this time on unknown data (which may be in the form of an unknown data vector) for which the final result is not known. The output of the trained machine learning model (192) is then treated as a prediction of the information of interest relative to the unknown data.

While FIG. 1A and FIG. 1B show a configuration of components, other configurations may be used without departing from the scope of one or more embodiments. For example, various components may be combined to create a single component. As another example, the functionality performed by a single component may be performed by two or more components.

FIG. 2 shows a flowchart of a method for merging of dissimilar data structures having dissimilar data for generation of machine learning input, in accordance with one or more embodiments. The method of FIG. 2 may be implemented using the system of FIG. 1 and one or more of the steps may be performed on or received at one or more computer processors.

Step 200 includes receiving a first data structure storing first data, in a first format, regarding a subject associated with a key stored in the first data structure. The first data structure includes a profile of a user that includes the key. The second data structure may be retrieved from a remote data source using the key.

The first data structure may be received from a first data source. For example, the first data structure may be received from a user profile associated with a local software application. The term "local" means that the software application is hosted by the server or accessible by the server. In an embodiment, the computer processor may retrieve the first data structure, may receive the first data structure sent by some other computer process, or a combination thereof.

Step 202 includes receiving a second data structure storing second data, in a second format, regarding the subject associated with the key that is also stored in the second data structure. As described with respect to FIG. 1, the second data is dissimilar to the first data and the first format is dissimilar to the second format. The first data structure and the second data structure may be from different data sources. At least one of the different data sources may include a remote data source. A data source is "remote" when the data source is external to the server (e.g., a remote web site hosted by a third-party).

In an embodiment, the computer processor may retrieve the second data structure, may receive the second data structure sent by some other computer process, or a combination thereof. For example, the server may submit a query to a third-party data repository that stores information regarding the subject. The information returned by the third-party data repository is the second data structure received by the processor.

Step 204 includes relating the first data to the second data according to the key. As indicated above, both the first data structure and the second data structure include the key. Thus, data items in the first and second data structures are associated with (are related to) the same subject when the data items are associated with the same key in the two data structures. For example, a first data item is associated with the key in the first data structure and a second data item is associated with the key in the second data structure. In this case, the first data item and the second data item are related, and hence the first data is related to the second data according to the key.

Step 206 includes applying a data conversion controller to the first data structure and the second data structure to generate a third data structure. The data conversion controller may be one or more software applications that convert the first data structure to the third data structure and also convert the second data structure to the third data structure. Conversion also may include changing a first format of data in the first data structure to a third format of data in the third data structure, and changing a second format of data in the second data structure to the third format. In other words, the data conversion controller transforms the data in the two dissimilar data structures into a combined data structure that may be different than either of the initial data structures.

The exact process for converting data structures and formats depends on the nature of the original data structures and the nature of the third data structure. Data conversion software and utilities, such as those mentioned with respect to the data conversion controller (140) of FIG. 1 may accomplish the data conversion process.

In an embodiment, one or both of the original data structures may be of the same data structure type or data format as the third data structure, in which case "conversion" may include copying the data to the third data structure. In any case, as described with respect to FIG. 1, the third data structure stores, in a third data format and associated with the key, both the first data and the second data for the subject.

Step 208 includes applying a vector generation controller to the third data structure to generate a vector having a number of features representing the first data and the second data. The vector generation controller takes, as input, the third data structure and generates, as output, the vector.

The exact method of operation of the vector generation controller depends on the nature of the third data structure and the format selected for the third data structure. In an embodiment, the third data structure is a vector, in which case step 208 may be skipped. However, if the third data structure is natural language text, then an embedding utility, such as "Word2Vec," may transform the third data structure to the vector data structure.

The vector data structure, as indicated above, has a number of features representing both the first data and the second data. The number of features may include all relevant or desired information for each type of the subject for which predictions might be requested. For example, if the subject is a business having a certain industry type, then the number of features includes the pre-determined selection of features to be used when making a prediction for a subject of the subject's industry type. However, if the subject is a business having a different industry type, then the number of features includes another pre-determined selection of features to be used when making a prediction for another subject of a different industry type.

The number of features also may include all relevant or desired information for multiple different types of predictions to be performed by multiple different machine learning models. For example, in an embodiment, the trained supervised machine learning model may be selected from a number of available trained supervised machine learning models. The selection of the trained supervised machine learning model also may be based on a type of the subject.

Step 210 includes determining, from the features and according to a type of the subject, a subset of features. The subset of features has fewer features than the original number of features. For example, if the subject is a business and the "type" of the business is "business complexity," then the subset of features previously determined as being most useful for making a prediction for a complex business may be the subset of features. As described above with respect to FIG. 1A, limiting the number of features to be considered by the trained supervised machine learning model may improve the accuracy of the model.

The subset of features may be obtained by a number of different techniques. For example, a scalar matrix of weights may be applied to the full set of features. The scalar matrix is pre-defined by the types of the subjects. A value of "0" (or some other number) may be assigned in a location of the scalar matrix such that undesired features are set to a value of zero when the scalar matrix is multiplied by a matrix that defines the full set of features.

In another variation, determining the subset of features may include consideration of the prediction or to some other post-processing programming (e.g., generation of a procedure to be recommended based on the prediction of the trained supervised machine learning model). In this case, determining the subset of features may include determining a first feature related to a type of the subject (e.g., a complexity of the subject). Then, a second feature related to a procedure unrelated to the subject is determined (e.g., generation of a recommendation to the subject for professional management help). In this case, the subset of features includes both the first feature and the second feature.

A combination of techniques is also possible. For example, once the subset of features are known, a scalar matrix may be generated with weights such that when the scalar matrix is applied to the full set of features, the subset of features result. Other variations are also possible.

Step 212 includes applying a trained supervised machine learning model with the subset of features to the vector to generate a prediction. Applying the "trained supervised machine learning model with the subset of features" means that the trained supervised machine learning only considers the subset of features determined at step 210. Thus, the number of features available to the machine learning model may be constrained to a desired number of features that, empirically, maximize the accuracy of the resulting prediction. Applying the trained supervised machine learning model to the vector means that the vector is applied as input to the trained supervised machine learning model. The trained supervised machine learning model is then executed, generating an output. The output is the prediction.

The nature of the prediction depends on the programming of the trained supervised machine learning model. For example, if the trained supervised machine learning model is trained to determine when a business may benefit from a professional service, then the prediction is a probability that the business will benefit from the professional service. However, the exact nature of the prediction may change depending on the programming and training of the trained supervised machine learning model.

Step 214 includes presenting the prediction. The prediction may be presented using a variety of techniques. Presenting the prediction may include storing or displaying the prediction. Presenting the prediction may include providing the prediction to some other process. Presenting the prediction may include populating a user interface with information related to the prediction. For example, if the prediction satisfies a threshold (see below), then pre-determined information about the subject may be populated in the user interface.

In an example, presenting the prediction may include determining whether the prediction satisfies a threshold value. Satisfaction of the threshold value occurs when a pre-determined comparison between the prediction and the threshold value occurs. For example, satisfaction of the threshold value may occur when the prediction equals or exceeds the threshold value, when the prediction is less than the threshold value, or some other pre-determined condition occurs when the prediction is compared to the threshold value.

Figure 3:
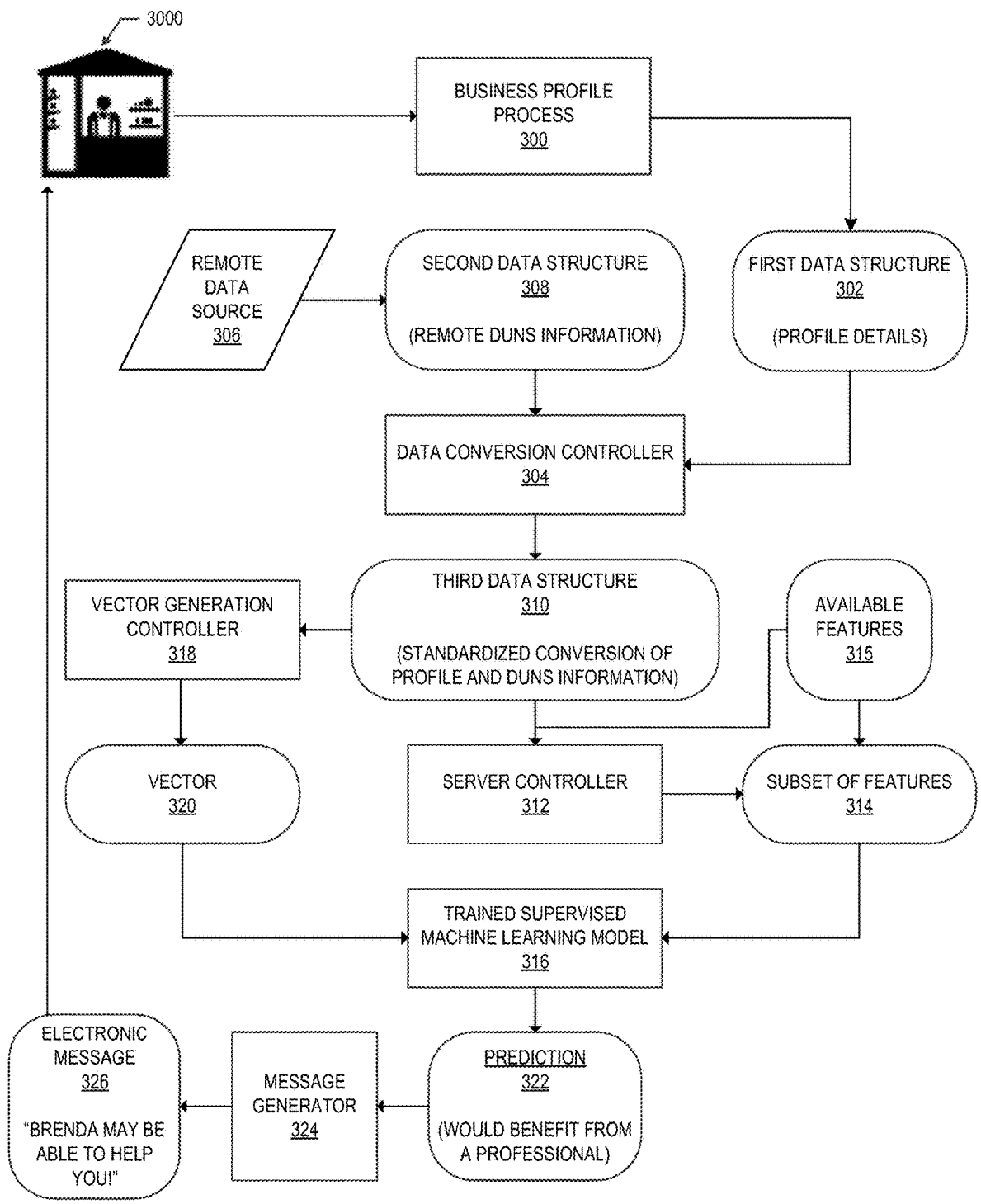
FIG. 3 shows an example using the system of FIG. 1A and the method of FIG. 2 to determine whether a user may benefit from using a professional, in accordance with one or more embodiments.

Continuing the example, when the prediction satisfies the threshold value, then another process is triggered. For example, the process may be to generate a message. The message in this example is an email, chat private message, pop-up window, or some other communication to an end user that the end user may benefit from professional assistance. This example is shown in FIG. 3.

In an embodiment, the method of FIG. 2 may terminate after step 214. However, the method of FIG. 2 may be varied.

For example, the method of FIG. 2 may include additional steps. In an embodiment, before step 208, the data in the third data structure may be cleansed to generate a cleansed data structure. Cleansing the data structure removes unwanted data. For example, cleansing the third data structure may include deduplication of the first data and the second data (i.e., removing information present in both data structures); conversion of similar data items in the first data and the second data to the third data format; conversion of the similar data items in the first data and the second data to the third data format, and thereafter combining or deduplicating the similar data items; removing incomplete data items from the first data and the second data; removing corrupt data items, removing data items that are not in the third format after conversion, and possibly many other data cleansing actions.

As used herein, "similar data items" are defined as two data items that convey a same type of information. For example, the "name" of a person may be "John Doe" in one data set, but "John William Doe" in another data set. The data items are not identical, and thus do not match, but the data items are similar because both pertain to the name of the same subject.

In another example, the method of FIG. 2 may include training the supervised machine learning model in order to generate the trained supervised machine learning model. Training may be performed after step 206 (applying the data conversion controller) and before step 210 (determining the subset of features). Training may be performed using the cleansed data structure. Training may be performed according to the method described with respect to FIG. 1B.

In another example, the method of FIG. 2 may include selecting the trained supervised machine learning model from among multiple trained supervised machine learning models. Each of the trained supervised machine learning models may be trained on a different subset of the first data and the second data in the third data structure, using the method of FIG. 1B. For example, each trained supervised machine learning model may be trained to make a prediction with respect to a particular type of subject.

Other variations are possible. For example, while the various steps in this flowchart are presented and described sequentially, at least some of the steps may be executed in different orders, may be combined or omitted, and at least some of the steps may be executed in parallel. Furthermore, the steps may be performed actively or passively.

FIG. 3 shows a system for using the system of FIG. 1A and the method of FIG. 2 to determine whether a user may benefit from using a professional, in accordance with one or more embodiments. In the example of FIG. 3, an end user (3000) uses financial management software hosted on a server. The financial management software includes a business profile process (300) that gathers information about the end user (3000). The gathered information may include demographic information and financial information stored with respect to the financial management software.

The gathered information is stored as a first data structure (302) that stores the profile details regarding the user. The first data structure (302) may be the first data structure (102) of FIG. 1A.

The first data structure (302) is provided as input to a data conversion controller (304). However, the first data structure (302) is deemed insufficient information for a trained supervised machine learning model to generate the desired prediction at a desired accuracy.

Thus, the server retrieves additional data from a remote data source (306). In this example, the remote data source (306) is a database storing DUNS data regarding many businesses, including the end user (3000). The information in the remote data source (306) is stored in the form of a second data structure (308) that includes the DUNS information regarding the end user (3000). The second data structure (308) may be the second data structure (110) of FIG. 1A. The second data structure (308) is dissimilar to the first data structure (302). Once retrieved, the second data structure (308) is provided as input to the data conversion controller (304).

The data conversion controller (304) converts both the first data structure (302) and the second data structure (308) into a third data structure (310). The third data structure (310) may be the third data structure (118) of FIG. 1A. The third data structure (310) includes both the remote DUNS information regarding the end user (3000) as well as the profile details regarding the end user (3000). The data conversion controller (304) also converts the original formats of both sets of information to a common data format for the third data structure (310).

In addition, the data conversion controller (304) also may cleanse the data in the third data structure (310). Duplicate information in the second data structure (308) and the first data structure (302) may be removed, incomplete or corrupt data may be removed, and other data cleansing actions such as those described above may be performed.

The third data structure (310) is provided as input to a vector generation controller (318). The vector generation controller (318) converts the third data structure (310) to a vector (320). The vector (320) is then provided as input to a trained supervised machine learning model (316).

The third data structure (310) is also provided as input to a server controller (312). The server controller (312) uses information in the third data structure (310) to select a subset of features (314) that should be applied by the trained supervised machine learning model (316).

In particular, rules defined by the server controller (312) are applied to the information in the third data structure (310) to determine a complexity value of the business of the end user (3000). The server controller (312) then uses the complexity value to select, from among available features (315), the subset of features (314).

A scalar matrix is generated by the server controller (312) based on the subset of features (314) selected for the current prediction task. The server controller (312) applies the scalar matrix to the trained supervised machine learning model (316) in order to force the trained supervised machine learning model (316) to consider only the subset of features (314) when making a prediction.

The trained supervised machine learning model (316) with the subset of features (314) is then applied to the vector (320). In this example, the trained supervised machine learning model (316) is a "bag of topics" supervised machine learning model.

The output of the trained supervised machine learning model (316) is a prediction (322). The prediction (322) is a number representative of a probability that the end user (3000) would benefit from the services of a professional. In this example, the threshold satisfies a pre-determined threshold value.

Accordingly, a message generator (324) may identify a professional that is known to work with businesses corresponding to the business type of the end user (3000). The message generator (324) creates an electronic message (326) suggesting that the professional may be able to help the end user (3000). In this example, the electronic message (326) is "Brenda may be able to help you!" The electronic message (326) is then transmitted to the end user (3000).

The example of FIG. 3 should not limit other embodiments. For example, the system of FIG. 1A, and FIG. 1B, and the method of FIG. 2, may be used in non-business settings. In particular, one or more embodiments may be used for scientific research, such as to predict fluid dynamics based on types of fluids present in a physical system when information regarding the fluids or fluid dynamics comes from dissimilar data sources.

Figure 4:
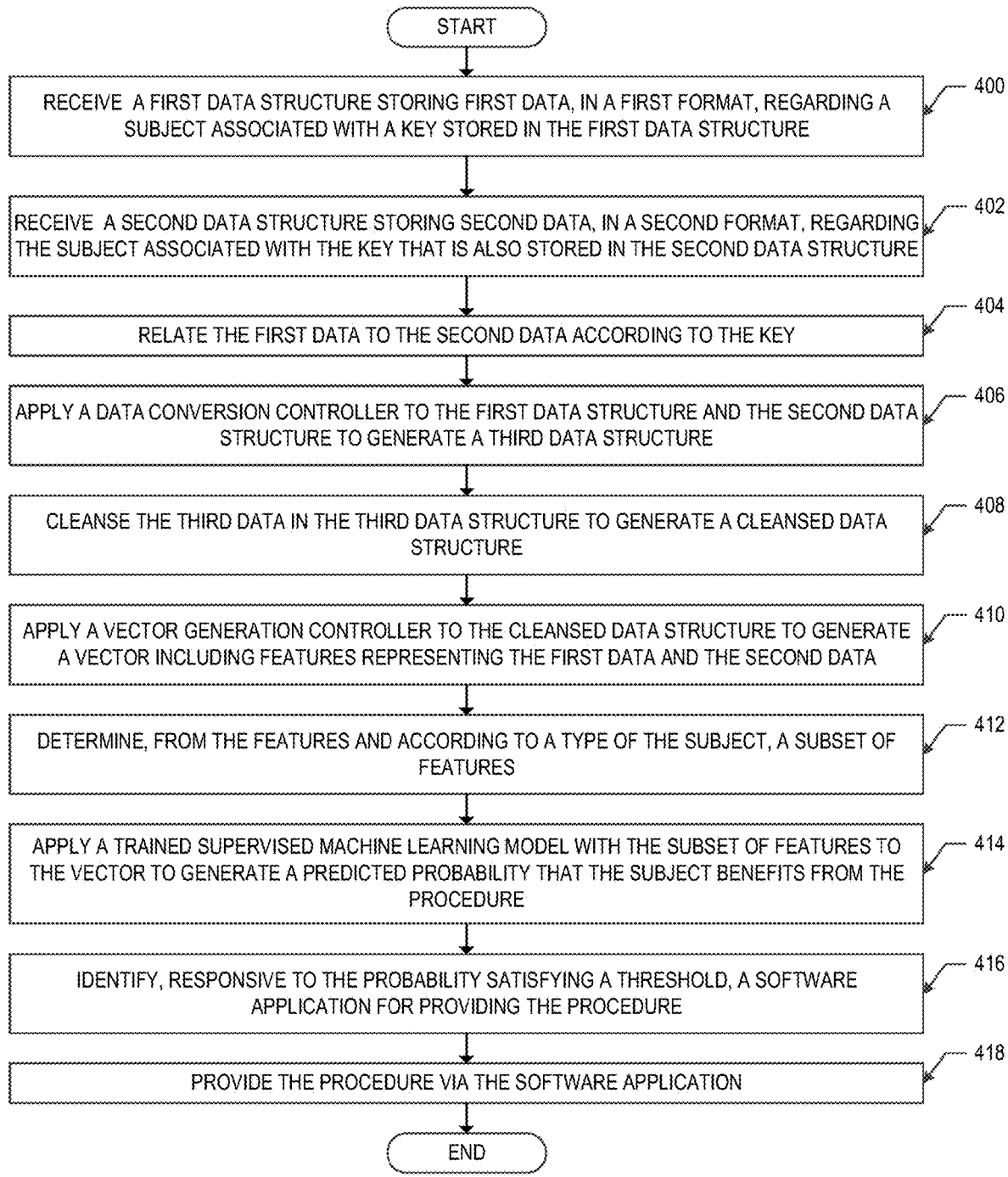
FIG. 4 shows an example of the method of FIG. 2 based on the system described with respect to FIG. 3, in accordance with one or more embodiments.

FIG. 4 shows an example of the method of FIG. 2 based on the system described with respect to FIG. 3, in accordance with one or more embodiments. The method of FIG. 4 is directed to determining whether a procedure (e.g., generation and transmission of an electronic message) should be provided to a subject (e.g., a business user).

Step 400 includes receiving, at a processor, a first data structure storing first data, in a first format, regarding a subject associated with a key stored in the first data structure. Step 400 is similar to step 200 in FIG. 2. Further, one or more of the steps of FIG. 4 may be performed on or received at one or more computer processors.

Step 402 includes receiving a second data structure storing second data, in a second format, regarding the subject associated with the key that is also stored in the second data structure. The second data is dissimilar to the first data and the first format is dissimilar to the second format. Step 402 is similar to step 202 in FIG. 2.

Step 404 includes relating the first data to the second data according to the key. Step 404 is similar to step 204 in FIG. 2.

Step 406 includes applying a data conversion controller to the first data structure and the second data structure to generate a third data structure. The third data structure stores, in a third data format and associated with the key, both the first data and the second data for the subject. Step 406 is similar to step 206 in FIG. 2.

Step 408 includes cleansing the third data structure to generate a cleansed data structure. Cleansing the third data structure may include removing duplicate data items present in the first and second data structures, removing implement data items present in one or both data structures, etc., as described above with respect to a variation of the method of FIG. 2.

Step 410 includes applying a vector generation controller to the cleansed data structure to generate a vector including features representing the first data and the second data. Step 410 is similar to step 208 in FIG. 2.

Step 412 includes determining, from the features and according to a type of the subject, a subset of features. The subset of features includes fewer features than the features. Determining the subset of features includes determining a first feature related to a complexity of the subject. Determining the subset of features also includes determining a second feature related to a procedure unrelated to the subject. The subset of features include at least the first feature and the second feature. Determining the subset of features also may be determined by selecting one or more of the original set of features based on a type of the subject. Otherwise, step 412 may be similar to step 210 of FIG. 2.

Step 414 includes applying a trained supervised machine learning model with the subset of features to the vector to generate a prediction. The prediction is a probability that the subject benefits from the procedure. Step 414 is otherwise similar to step 212 in FIG. 2.

Step 416 includes identifying, responsive to the probability satisfying a threshold, a software application for providing the procedure. Identifying the software application may be performed based on the type of the subject. For example, three different software applications could be used to provide different aspects of a procedure or different procedures suitable for corresponding specific subject types. When the probability satisfies the threshold, then one of the three software applications corresponding to the subject type is identified to provide the procedure.

Step 418 includes providing the procedure via the software application. Providing the procedure may depend on the nature of the procedure. For example, the software application may execute the procedure for the subject. The procedure may be to transmit data, a message, or the software application to the subject. Providing the procedure may be performed by generating the electronic message (326) described with respect to FIG. 3. Providing the procedure may be performed by presenting the prediction, as described with respect to step 214 in FIG. 2. Other variations are possible.

In an embodiment, the method of FIG. 4 may terminate thereafter. However, the method of FIG. 4 may be varied by adding, removing, or changing the order of the above-described steps.

While the various steps in this flowchart are presented and described sequentially, at least some of the steps may be executed in different orders, may be combined or omitted, and at least some of the steps may be executed in parallel. Furthermore, the steps may be performed actively or passively.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
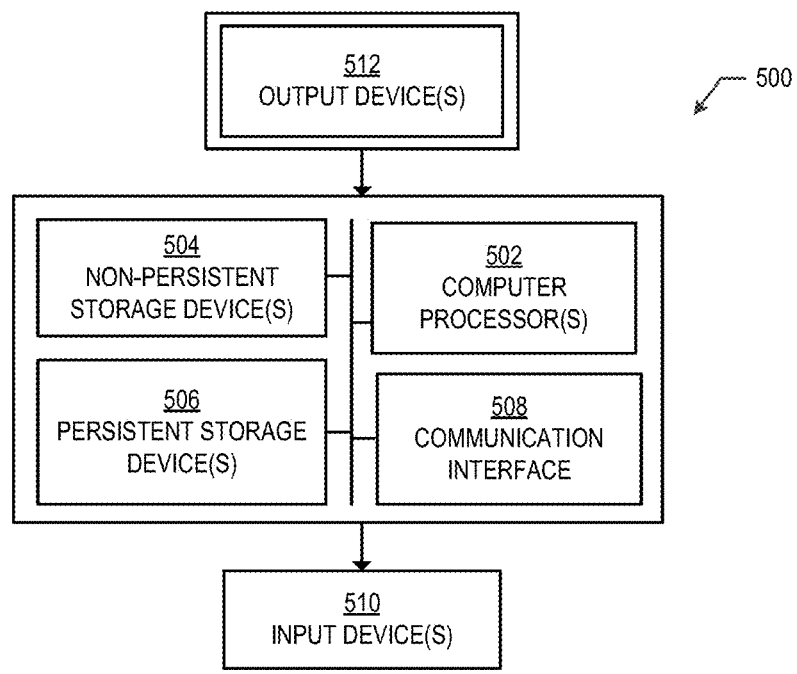
FIG. 5A and FIG. 5B show a computing system and network environment, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores or micro-cores of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output devices may be the same or different from the input device(s) (510). The input and output device(s) may be locally or remotely connected to the computer processor(s) (502). Many different types of computing systems exist, and the aforementioned input and output device(s) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
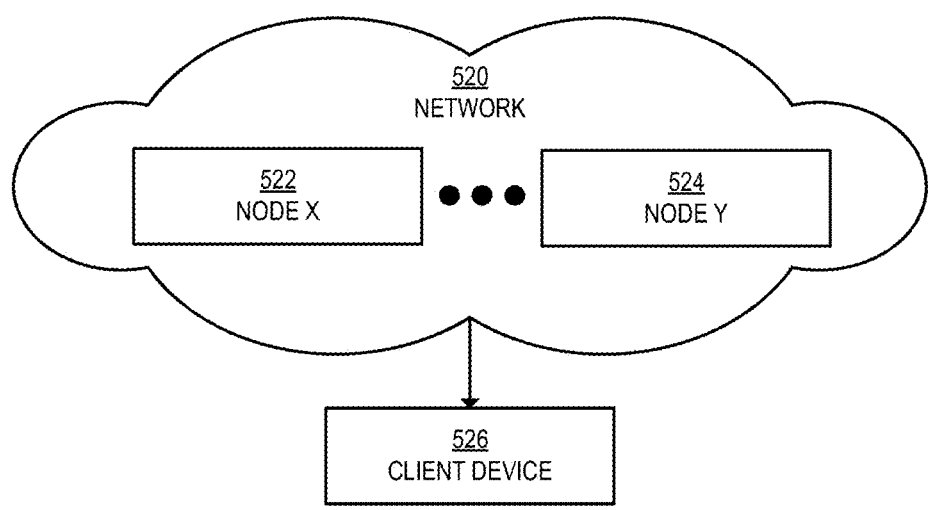

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    receiving, at a processor, a first data structure storing first data, in a first format, regarding a subject associated with a key stored in the first data structure;
    receiving, at the processor, a second data structure storing second data, in a second format, regarding the subject associated with the key that is also stored in the second data structure, wherein the second data is dissimilar to the first data and the first format is dissimilar to the second format;
    relating the first data to the second data according to the key;
    applying a data conversion controller to the first data structure and the second data structure to generate a third data structure, wherein the third data structure stores, in a third data format and associated with the key, both the first data and the second data for the subject;
    applying a vector generation controller to the third data structure to generate a vector comprising a plurality of features representing the first data and the second data;
    determining, from the plurality of features and according to a type of the subject, a subset of features comprising fewer features than the plurality of features;
    applying a trained supervised machine learning model with the subset of features to the vector to generate a prediction; and
    presenting the prediction.

2. The method of claim 1, further comprising:
    cleansing the third data structure to generate a cleansed data structure.

3. The method of claim 2, wherein cleansing comprises at least one of:
    deduplication of the first data and the second data,
    conversion of similar data items in the first data and the second data to the third data format,
    conversion of the similar data items in the first data and the second data to the third data format, and thereafter combining or deduplicating the similar data items, and
    removing incomplete data items from the first data and the second data.

4. The method of claim 2, further comprising:
    training, after applying the data conversion controller and before determining the subset of features, the supervised machine learning model, wherein training is performed using the cleansed data structure.

5. The method of claim 1, further comprising:
    selecting the supervised machine learning model from among a plurality of supervised machine learning models, wherein each of the plurality of supervised machine learning models is trained on a different subset of the first data and the second data in the third data structure.

6. The method of claim 1, wherein the first data structure and the second data structure are from different data sources, and wherein at least one of the different data sources comprises a remote data source.

7. The method of claim 1,
wherein the first data structure comprises a profile of a user that includes the key, and
wherein the second data structure is retrieved from a remote data source using the key.

8. The method of claim 1, wherein determining the subset of features comprises:
applying a scalar matrix of weights to the plurality of features to generate the subset of features.

9. The method of claim 1, wherein determining the subset of features comprises:
determining a first feature related to a complexity of the subject, and
determining a second feature related to a procedure unrelated to the subject,
wherein the subset of features include at least the first feature and the second feature.

10. The method of claim 9, wherein the prediction comprises a probability that the subject benefits from the procedure.

11. The method of claim 1, further comprising:
populating a user interface with information related to the prediction.

12. A system comprising:
a computer processor;
a data repository in communication with the computer processor and storing:
a first data structure storing first data, in a first format, regarding a subject associated with a key stored in the first data structure,
a second data structure storing second data, in a second format, regarding the subject associated with the key that is also stored in the second data structure, wherein the second data is dissimilar to the first data and the first format is dissimilar to the second format,
a third data structure, wherein the third data structure stores, in a third data format and associated with the key, both the first data and the second data for the subject,
a type of the subject,
a vector comprising a plurality of features representing the first data and the second data,
a subset of features comprising fewer features than the plurality of features, and
a prediction;
a data conversion controller which, when executed by the computer processor and applied to the first data structure and the second data structure, generates the third data structure;
a vector generation controller which, when executed by the computer processor and applied to the third data structure, generates the vector;
a trained supervised machine learning model which, when executed by the computer processor and applied with the subset of features to the vector, generates the prediction; and
a server controller which, when executed by the computer processor, is configured to:
relate the first data to the second data according to the key,
determine, from the plurality of features and according to the type of the subject, the subset of features, and
present the prediction.

13. The system of claim 12, wherein the server controller is further configured to:
cleanse the third data structure to generate a cleansed data structure.

14. The system of claim 13, further comprising:
a training controller which, when executed by the computer processor, trains, after applying the data conversion controller and before determining the subset of features, the trained supervised machine learning model, wherein training is performed using the cleansed data structure.

15. The system of claim 12, wherein the first data structure and the second data structure are from different data sources, and wherein at least one of the different data sources comprises a remote data source.

16. The system of claim 12, wherein the first data structure comprises a profile of a user that includes the key, and wherein the second data structure is retrieved from a remote data source using the key.

17. The system of claim 12, wherein determining the subset of features comprises:
determining a first feature related to a complexity of the subject; and
determining a second feature related to a procedure unrelated to the subject,
wherein the subset of features include at least the first feature and the second feature.

18. The system of claim 17, wherein the prediction comprises a probability that the subject benefits from the procedure.

19. The system of claim 12, further comprising:
a user interface, and wherein the server controller is further configured to populate the user interface with information related to the prediction.

20. A method comprising:
receiving, at a computer processor, a first data structure storing first data, in a first format, regarding a subject associated with a key stored in the first data structure;
receiving, at the computer processor, a second data structure storing second data, in a second format, regarding the subject associated with the key that is also stored in the second data structure, wherein the second data is dissimilar to the first data and the first format is dissimilar to the second format;
relating the first data to the second data according to the key;
applying a data conversion controller to the first data structure and the second data structure to generate a third data structure, wherein the third data structure stores, in a third data format and associated with the key, both the first data and the second data for the subject;
cleansing the third data structure to generate a cleansed data structure;
applying a vector generation controller to the cleansed data structure to generate a vector comprising a plurality of features representing the first data and the second data;
determining, from the plurality of features and according to a type of the subject, a subset of features comprising fewer features than the plurality of features, wherein determining further comprises:
determining a first feature related to a complexity of the subject, and
determining a second feature related to a procedure unrelated to the subject, wherein the subset of features include at least the first feature and the second feature;

applying a trained supervised machine learning model with the subset of features to the vector to generate a prediction comprising a probability that the subject benefits from the procedure;

identifying, responsive to the probability satisfying a threshold, a software application for providing the procedure; and providing the procedure via the software application.

* * * * *